K. W. HEYMAN.
BALL BEARING.
APPLICATION FILED MAR. 26, 1918.
1,386,570.
Patented Aug. 2, 1921.
2 SHEETS—SHEET 1.
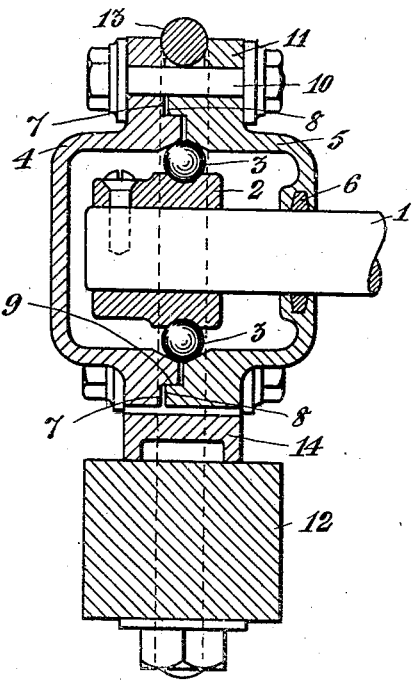
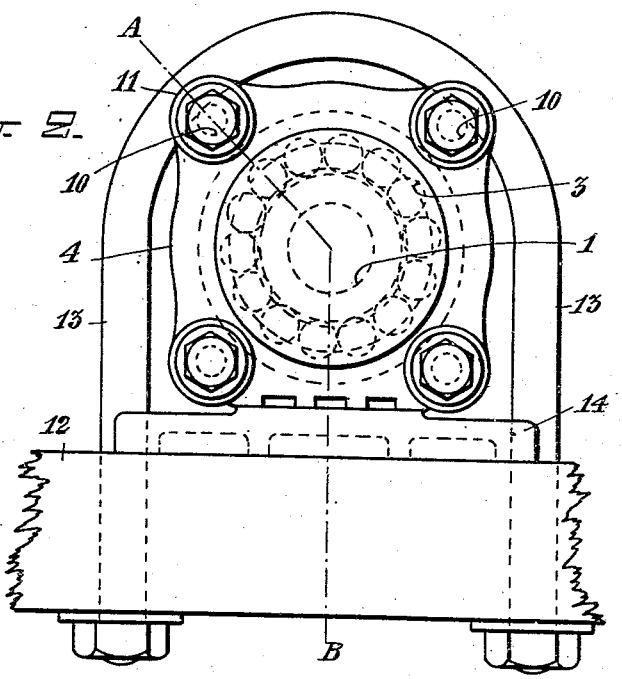

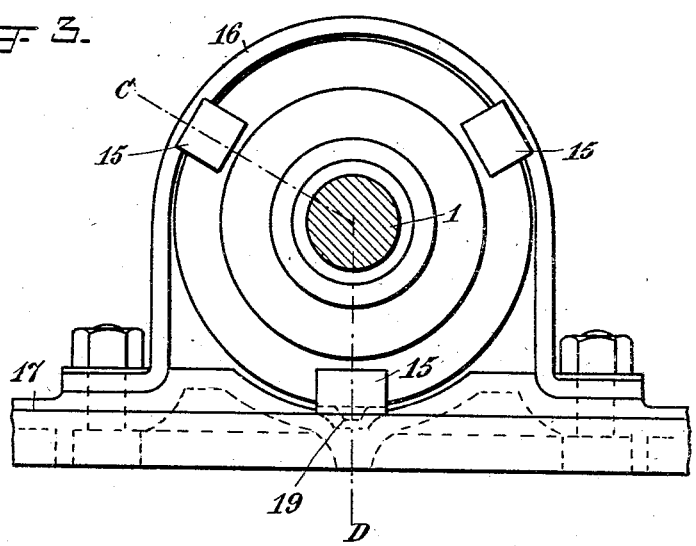
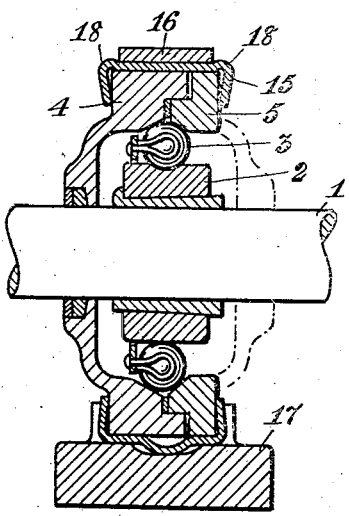

UNITED STATES PATENT OFFICE.

KNUT WALDEMAR HEYMAN, OF STOCKHOLM, SWEDEN.

BALL-BEARING.

1,386,570.      Specification of Letters Patent.      Patented Aug. 2, 1921.

Application filed March 26, 1918. Serial No. 224,819.

*To all whom it may concern:*

Be it known that I, KNUT WALDEMAR HEYMAN, subject of the King of Sweden, residing at Brunkebergstorg 15, Stockholm, Sweden, have invented certain new and useful Improvements in Ball-Bearings, of which the following is a specification.

In many cases, an ordinary bearing of some simple and easily managed construction is employed instead of a ball-bearing, although such a bearing might possibly be preferable if one of comparatively equally simple construction and as reliable as the one first-mentioned, could be obtained.

The object of the present invention is to make such a ball-bearing which is simple in construction, reliable in use, cheap to manufacture and, in other respects, so arranged that its rolling slides and balls are well protected so that the bearing will be suitable to employ in such cases—in agricultural machines and the like, for example—where it can often be exposed to somewhat careless or unsuitable treatment. In order to attain these ends and, at the same time to obtain a bearing with exchangeable parts, the bearing is preferably made with divided ball-races and is mainly characterized by one of those parts on which there is a ball-race, or by both of these parts, being so formed that together they form a bearing cap.

A ball-bearing arranged in accordance with this invention is shown as an illustration in the appended drawing in Figure 1 in a section along the line A—B, in Fig. 2, and in Fig. 2 seen from the side. An altered form of the bearing is shown in Fig. 3 from the side, and, in Fig. 4 in transverse section along the line C—D in Fig. 3.

1 is the shaft, 2 a ring or the like arranged on the same and on which the inner ball-race of the bearing is situated; 3 are the balls of the bearing. As was mentioned above, the outer ball-race of the bearing is preferably divided, and the two parts 4 and 5 are arranged one on each side of the middle plane of the row of the balls. In accordance with this invention either one of these parts in which there is a ball-race, or, as in Fig. 1, both of these said parts are so formed that together they form a bearing cap in which the ring 2, together with that part of the shaft on which the said ring is fastened and the entire ball-set is inclosed and well protected. The part 4 which is on the same side of the row of the balls as the end of the shaft 1 is in the form of a spherical bush or cap, which can suitably be cast in a single piece, while the other part 5, which can also be cast in a similar piece, is of approximately the same shape, so that, when the two parts are applied to each other they form together a house or cover in which the ball-bearing is inclosed. When the parts 4 and 5 are being cast, the ball-race of the same can be preferably case-hardened. The part 5 through which the shaft enters into the bearing, is provided with an opening in the periphery of which there is a recess or slot for a packing ring 6 of some suitable material resting against the shaft. If the shaft is to go altogether through the bearing it is clear that a similar opening is arranged in the part 4. Instead of making each of the parts 4 and 5 in a single piece, as mentioned above, the one or the other of the parts, or both of them, can, as is easily seen, be so made that the bottom, or a part of the bottom, contingently, together with an adjacent side part of that part, which has been made in the form of a spherical bush or cap, is in a special piece, which is detachable from the other part, so that the bearing can receive the necessary attention without having to be taken to pieces for that purpose. Whether the parts 4 and 5 are made in the one way or the other, the one part—part 4 for example—is provided at that surface which is turned to the other part, with a depression 7, or the like, in which there engages a corresponding projection 8, arranged on the other part 5, which projection 8 has a surface 9 which rests against a similar surface on the other part, these surfaces forming guides fitting the one into the other, so that the parts, although the ball-races are retained in their proper positions, can move in a direction to and from each other but can not, with respect to each other, move in a direction, which is transverse to the last-mentioned movement-direction.

In accordance with the embodiment shown in Figs. 1 and 2, the two parts 4 and 5 are kept close to each other preferably by means of a number of bolts 10 which pass through projections 11 of the parts, by means of which bolts the ball-races on the parts are adjusted into a suitable position with respect to each other and to the balls 3.

In order to firmly keep a bearing of the kind in question in its place, against a beam or bar 12, for example, there is arranged around the bearing a clamp 13, which is arranged in a suitable slot in one of the parts 4 and 5, the ends of the clamp which go through the beam being provided with nuts by the tightening of which the bearing is kept against the beam. Between the beam and the bearing it can be of advantage to arrange a plate 14 which has a resting surface suitable for resting against the beam and which is provided with slots for the clamp, so that the plate can not be displaced on the beam. Those surfaces by which the bearing and the beam rest against each other are preferably so arranged that at least one of the parts 4 and 5 can, when the parts are adjusted, glide on the plate, without its being necessary to loosen the clamp.

In accordance with the embodiment shown in Figs. 3 and 4, the two parts 4 and 5 in which the ball-races are arranged, are kept together by catches arranged along their periphery, which catches are retained in their places by a band, or the like, arranged around the bearing, which band is, contingently, so arranged that, similarly to the clamp 13, it serves at the same time to retain the bearing in its place. The holders or catches are marked 15, and serve, as was mentioned above, to keep the two parts 4 and 5 in the desired position against each other, so that they can not be moved away from each other by the pressure of the balls. These holders 15 are preferably constructed of hoop-steel of suitable transverse section and with the ends bent in the form of hooks which rest against the outer sides of the parts 4 and 5 and press the parts against each other as if by a spring. The holders, which can be of any desired number, are kept in their places by means of a band or a clamp 16, which can preferably be provided with bent ends, as shown in Fig. 3, so that the bearing, by means of these ends and the bolts or the like going through them, can, at the same time, be attached to the fastening of the bearing, whether this fastening be in the form of a special plate 17 or the frame itself, or the like, which is to support the bearing. In order that the holders 15 may not alter their position they are preferably arranged in slots made for them in the bearing parts 4 and 5, while, on the other hand, in order that the band 16 may occupy its right position on the holders, and in order, too, that the bearing may not be displaceable in the longitudinal direction of the shaft in respect to the band, the holders at the places mentioned are bent somewhat outward, so as to form guide edges, 18, between which the band 16 is arranged. In order to still further prevent a displacement of the bearing in the direction just mentioned, one or more holders 15 are arranged at that part where the bearing rests against the plate or framework, this holder or holders being provided with a projection 19 which engages in a corresponding recess in the plate, etc.

It is evident that the arrangements described above can be carried out with bearings of the kind mentioned independently of whether the parts 4 and 5 have the shape which is shown by the full lines, or whether they together form a closed bearing cap, as shown by the dotted lines, or whether contingently they happen to be arranged in some other way. It is also clear that the band 16 can be arranged as a ring arranged around the bearing by means of which the holders are retained in their places, in which case the bearing is attached to the plate 17 or to the framework in some other way which is suitable for the purpose.

I claim:

1. In ball bearings, the combination of an inner ball race ring, adapted to be attached to the shaft, an outer ball race, divided transversely to the shaft into two annular parts, said outer ball race parts being made integral with each of two parts forming a housing which embraces the inner race ring as well circumferentially as at the ends and the inner edges of which lie substantially flush with the inside of the inner race ring, that is to say lie substantially at the same radial distance from the axis of the shaft as the inner side of the inner race ring, so that the said outer race ring forms a dust-proof housing for the whole bearing.

2. In ball bearings the combination of an inner ball race ring, adapted to be attached to the shaft, an outer ball race divided transversely to the shaft into two annular parts, said outer ball race parts being made integral with each of two parts forming a housing which embraces the inner race ring as well circumferentially as at the ends, said inner edges being provided with packing rings adapted to abut against the shaft.

3. In ball bearings the combination of an inner ball race ring adapted to be attached to the shaft, an outer ball race divided transversely to the shaft into two annular parts, said outer ball race parts being made integral with each of two parts forming a housing which embraces the inner race ring as well circumferentially as at the ends, said housing being shaped so as to form a relatively great free space between its inside and the ends of the inner race ring.

4. In ball bearings, the combination of an inner ball race ring adapted to be attached to the shaft, an outer ball race divided transversely to the shaft into two annular parts, said outer ball race parts being made integral with each of two parts forming a housing which embraces the inner race ring as well circumferentially as at the ends, said housing being shaped so as to form a relatively great free space between its inside and the ends of the inner race ring, the inner edges of the said outer ball race parts being grooved to receive packing rings, adapted to abut against the shaft.

5. In ball bearings the combination of an inner ball race ring, adapted to be attached to the shaft, an outer ball race, divided transversely to the shaft into two annular parts, said outer ball race parts being made integral with each of two parts forming a housing which embraces the inner race ring as well circumferentially as at the ends and the inner edges of which lie substantially in flush with the inside of the inner race ring, that is to say lie substantially at the same radial distance from the axis of the shaft as the inner side of the inner race ring, so that the said outer race ring forms a dust proof housing for the whole bearing, a number of catches arranged at intervals on the periphery of the housing, said catches consisting of U-shaped clamps, which hold the outer race parts together.

6. In ball bearings, the combination of an inner ball race, an outer ball race, divided into two parts, said outer ball race parts being made integral with each of two parts forming together a complete housing of the bearing, a number of catches arranged at intervals on the periphery of the housing so as to hold the said parts together, a frame surrounding the periphery of the housing on the outside of the catches, said frame consisting of a U-shaped band and a plate to which the ends of the band are secured.

7. In ball bearings, the combination of an inner ball race adapted to rotate with the shaft, a stationary outer ball race ring, divided transversely to the shaft into two annular parts, said outer ball race parts being made integral with each of two parts, and packing in the divided parts of the ball race so as to form a dust-proof housing for the ball races.

In testimony whereof I affix my signature in presence of two witnesses.

KNUT WALDEMAR HEYMAN.

Witnesses:
 JACOB BAGGE,
 FRITZ E. HALLIN.